US010623276B2

(12) United States Patent
Ko et al.

(10) Patent No.: US 10,623,276 B2
(45) Date of Patent: Apr. 14, 2020

(54) MONITORING AND MANAGEMENT OF SOFTWARE AS A SERVICE IN MICRO CLOUD ENVIRONMENTS

(71) Applicant: International Business Machines Corporation, Armonk, NY (US)

(72) Inventors: Bongjun Ko, Harrington Park, NJ (US); Christian Makaya, Summit, NJ (US); Jorge J. Ortiz, New York, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/982,456

(22) Filed: Dec. 29, 2015

(65) Prior Publication Data
US 2017/0187582 A1 Jun. 29, 2017

(51) Int. Cl.
 G06F 15/173 (2006.01)
 H04L 12/24 (2006.01)
 G06F 8/65 (2018.01)
 H04L 12/26 (2006.01)

(52) U.S. Cl.
 CPC ........... H04L 41/5006 (2013.01); G06F 8/65 (2013.01); H04L 43/08 (2013.01); H04L 41/5096 (2013.01)

(58) Field of Classification Search
 CPC ........ H04L 43/08; H04L 41/5006; G06F 8/65
 USPC ....... 709/224, 202, 203, 206, 217, 219, 248; 370/395.21, 241.1, 336, 400
 See application file for complete search history.

(56) References Cited

U.S. PATENT DOCUMENTS

| 7,545,752 | B2 | 6/2009 | Krautkremer et al. |
| 8,584,112 | B2 | 11/2013 | Young et al. |
| 8,782,637 | B2 | 7/2014 | Khalid |

(Continued)

OTHER PUBLICATIONS

Selimi et al., "TROBADOR: Service Discovery for Distributed Community Network Micro-Clouds," 2015 IEEE 29th International Conference on Advanced Information Networking and Applications, pp. 642-649 (Mar. 2015).

(Continued)

Primary Examiner — Thuong Nguyen
(74) Attorney, Agent, or Firm — Kevin Jordan; Michael J. Chang, LLC

(57) ABSTRACT

Techniques for monitoring and managing applications in an environment with distributed administrative domains (such as a micro-cloud environment) are provided. In one aspect, a method for managing an application in an environment with distributed administrative domains includes the steps of: identifying points in a life cycle of the application where communication is allowed between the distributed administrative domains; obtaining, by the provider, management specific information for the application at the points identified in the life cycle of the application where communication is allowed between the distributed administrative domains, wherein the obtaining is performed using a filtering script provided by the user and a management script provided by the provider to validate that the management specific information conforms to a predetermined information exchange criteria; and performing management functions using the management specific information.

8 Claims, 3 Drawing Sheets

(56) References Cited

U.S. PATENT DOCUMENTS

| | | | |
|---|---|---|---|
| 9,009,804 B2 | 4/2015 | Abrams et al. | |
| 9,100,345 B2 | 8/2015 | Kothamasu et al. | |
| 2006/0007868 A1* | 1/2006 | Shinomiya | H04L 41/28 370/241.1 |
| 2006/0070035 A1* | 3/2006 | Ulrich | G06F 11/3688 717/124 |
| 2006/0206587 A1* | 9/2006 | Fabbrocino | H04L 63/10 709/219 |
| 2008/0059589 A1* | 3/2008 | Regnier | H04L 51/12 709/206 |
| 2012/0030672 A1* | 2/2012 | Zygmuntowicz | G06F 8/60 718/1 |
| 2012/0099024 A1* | 4/2012 | Ryu | H04N 21/4586 348/730 |
| 2012/0324069 A1 | 12/2012 | Nori et al. | |
| 2013/0262556 A1* | 10/2013 | Xu | G06F 9/5027 709/202 |
| 2013/0311631 A1 | 11/2013 | Koo et al. | |
| 2014/0079038 A1* | 3/2014 | Maeda | H04W 48/02 370/336 |
| 2014/0129173 A1* | 5/2014 | Kit | G06F 11/263 702/123 |
| 2014/0173137 A1* | 6/2014 | Jacobson | H04L 45/021 709/248 |
| 2014/0351842 A1 | 11/2014 | Sharif-Ahmadi et al. | |
| 2015/0088834 A1 | 3/2015 | Wright, Sr. | |
| 2015/0163179 A1 | 6/2015 | Maes et al. | |
| 2015/0188779 A1 | 7/2015 | McCanne et al. | |
| 2015/0188789 A1 | 7/2015 | Jayaprakash | |
| 2016/0140362 A1* | 5/2016 | Aghili | G06F 8/61 726/29 |
| 2016/0352632 A1* | 12/2016 | Nedeltchev | H04L 45/502 |
| 2016/0381178 A1* | 12/2016 | Angert | H04L 67/34 713/168 |

OTHER PUBLICATIONS

Gusev et al., "Developing a Ticket Management SaaS Solution," 2014 37th International Convention on Information and Communication Technology (MIPRO 2014), pp. 313-318 (May 2014).

* cited by examiner

MONITORING AND MANAGEMENT OF SOFTWARE AS A SERVICE IN MICRO CLOUD ENVIRONMENTS

FIELD OF THE INVENTION

The present invention relates to management operations for applications in a cloud environment, and more particularly, to techniques for monitoring and managing applications in an environment with distributed administrative domains between a provider of the application and a user of the application, such as a micro-cloud environment.

BACKGROUND OF THE INVENTION

A cloud environment is where a customer rents out or leases a capability (like computing infrastructure, or development platform or software packages, etc.) instead of buying it. A micro-cloud environment is one where the rented capability or software package runs on a server located on the premises of a user instead of in the cloud itself.

Micro-cloud environments allow the extension of benefits of cloud computing to enterprises with data that cannot be moved to the cloud because of security, regulatory, bandwidth or data size issues. However, a micro-cloud environment adds the challenge of application management to existing cloud solutions.

For instance, if an application which is rented out has an issue, e.g., it encounters a failure, or needs any other management operation, that aspect cannot be handled remotely from a cloud installation. The reason is that the micro-cloud environment is generally separated from the cloud instance due to firewalls that are located to prevent communication between the cloud site and the application execution site. Therefore, traditional solutions fail to work.

Therefore, techniques for application management in micro-cloud environments would be desirable.

SUMMARY OF THE INVENTION

The present invention provides techniques for monitoring and managing applications in an environment with distributed administrative domains between a provider of the application and a user of the application, such as a micro-cloud environment. In one aspect of the invention, a method for managing an application in an environment with distributed administrative domains between a provider of the application and a user of the application is provided. The method includes the steps of: identifying points in a life cycle of the application where communication is allowed between the distributed administrative domains; obtaining, by the provider, management specific information for the application at the points identified in the life cycle of the application where communication is allowed between the distributed administrative domains, wherein the obtaining is performed using a filtering script provided by the user and a management script provided by the provider to validate that the management specific information conforms to a predetermined information exchange criteria; and performing management functions using the management specific information.

A more complete understanding of the present invention, as well as further features and advantages of the present invention, will be obtained by reference to the following detailed description and drawings.

DETAILED DESCRIPTION OF PREFERRED EMBODIMENTS

As provided above, a micro-cloud environment provides unique application management challenges due to restrictions on communication between the cloud site and the application execution site. Current solutions for managing applications in multiple distributed locations require that the same administrative domain has control over all of the systems being managed. Micro-cloud environments, however, span multiple administrative domains, i.e., one domain managed by the customer of a cloud application and another domain managed by the cloud application provider. To date, no viable solutions exist for application management operations that might be needed in a micro-cloud environment, such as when an application experiences a failure.

Therefore, a new solution is needed for application management operations in micro-cloud environments. Advantageously, provided herein are techniques for effectively determining whether an application has run properly to completion in a micro-cloud environment. Namely, as will be described in detail below, the enterprise that is renting applications provides a set of criteria that ought to be satisfied in order to determine that the application has run properly, and the provider of the application provides a set of scripts that satisfy the criteria, as well as any additional criteria the provider may have. The scripts execute and if they complete satisfactorily, then the application is deemed to have executed satisfactorily. By splitting the functions into two sets of specifications—one that is provided by the user and one that is provided by the application provider, one can bypass many of the complex challenges associated with managing applications in a rental model.

As highlighted above, a micro-cloud environment involves at least two administrative domains, one being the user/customer of the cloud applications and the other being the application provider. For simplicity, these administrative enterprises are also referred to herein as the cloud application "user" and "provider," respectively.

Figure 1:
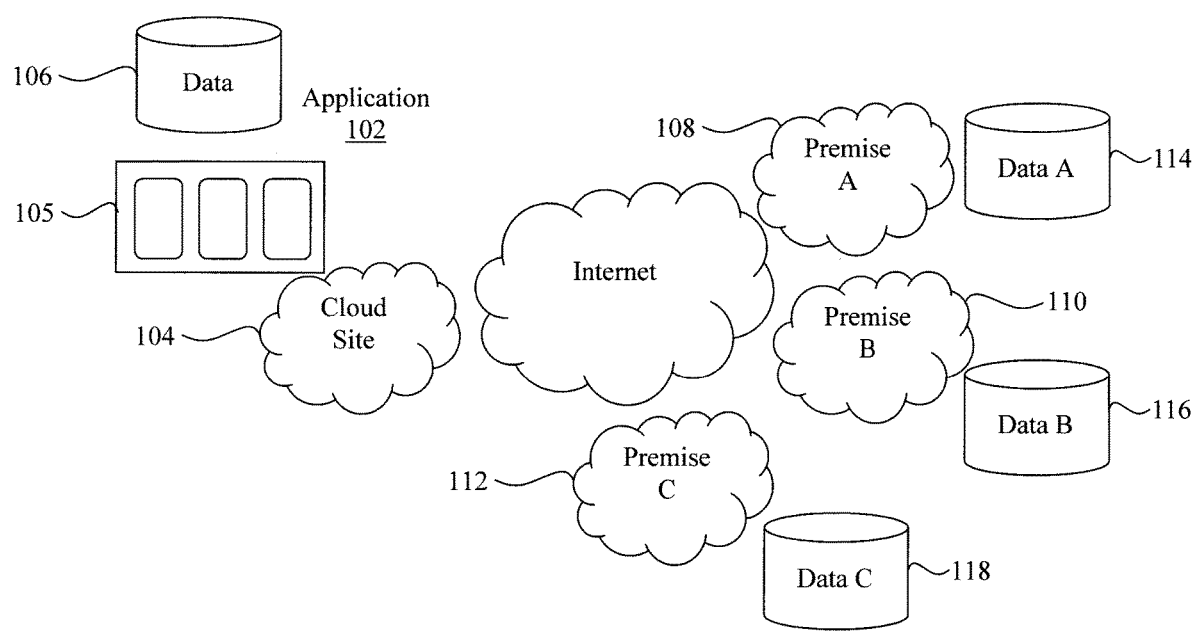
FIG. 1 is a diagram illustrating an exemplary micro-cloud environment according to an embodiment of the present invention.

A micro-cloud environment is one in which an application is executed in an environment which is not the same as the environment for which it was developed. The most common instance of a micro-cloud environment is the case where an enterprise (generically a user) rents an application from the provider of a cloud service, and executes the application within their own computing infrastructure. The operational environment is shown in FIG. 1.

In the micro-cloud environment, an application 102 is developed and located at a cloud site 104. The application is developed by application provider server(s) 105. See FIG. 1. The application 102 is designed so that it can operate on a data set 106 that is present in the cloud site 104. This is the manner in which many applications are developed in the cloud, or in a central location for access by many clients in an enterprise. The micro-cloud environment allows customers to take that application (e.g., accessed via the Internet) and have it run on data located in different premises, e.g., the application can be run on any of the data 114, 116, or 118 at any of the premises A, B or C (i.e., premises 108, 110, and 112, respectively) as shown in FIG. 1. The key feature of this environment is that there is often no access for any developer or administrator of the application to the application when it is running in the premises environment (i.e., premises A, B or C).

When an application is run in any cloud environment, there are a variety of tasks performed on the application that are considered management tasks. The goal of the management tasks is to provide features like (i) upgrade an application (ii) check if the configuration of an application needs to be updated for better performance (iii) check if the application has an error or a bug within itself and/or (iv) check if the application is running or if it has crashed, and similar functions. Generally, these management tasks are performed by an administrator or systems manager at the cloud site. However, when the micro-cloud based application is running on any of the client premises A, B, or C, such an administrator cannot access the application to perform any of these management task activities.

Figure 2:
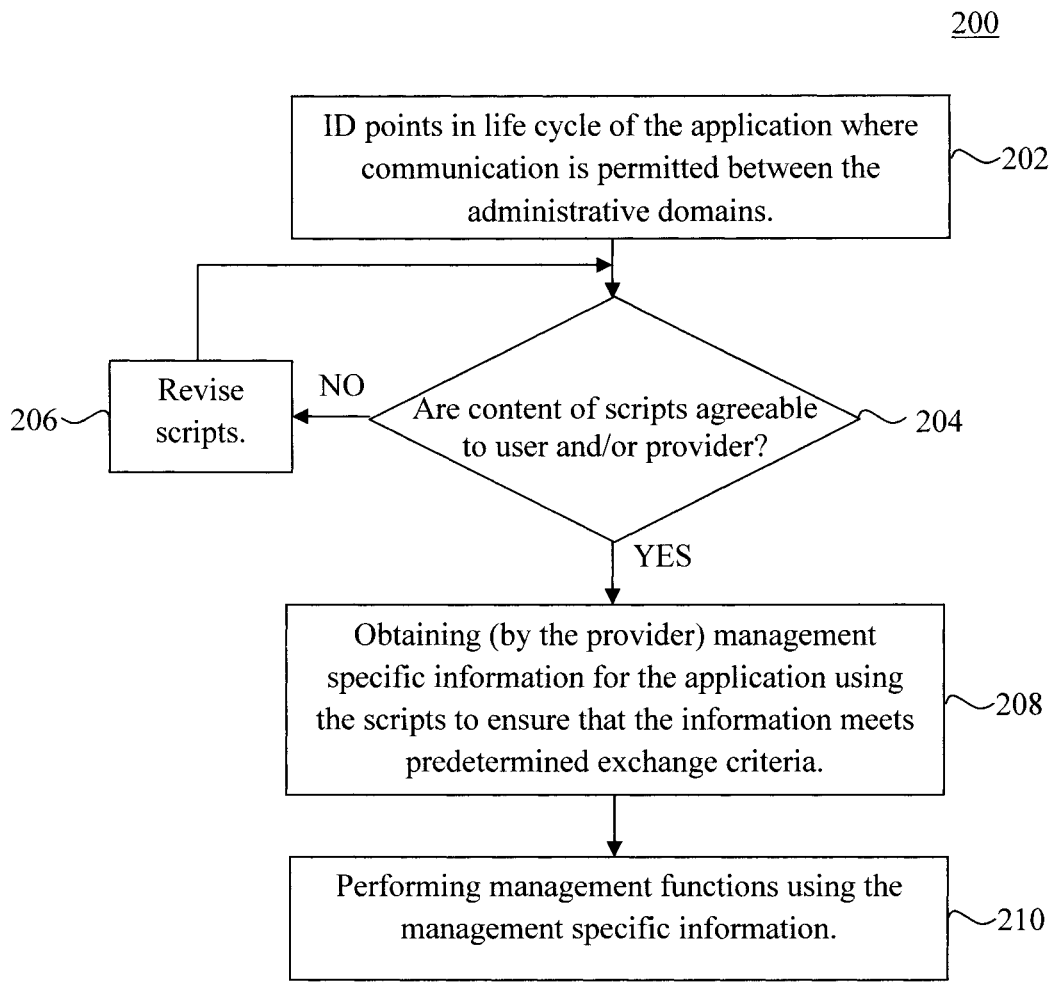
FIG. 2 is a diagram illustrating an exemplary methodology for managing an application in environments with distributed administrative domains between an provider of the application and a user of the application according to an embodiment of the present invention.

The present approach to solve this management problem is to introduce management operations only at specific points in the life cycle of an application. The life cycle of the application consists of all stages the application goes through during its existence from being installed on a machine to being uninstalled on the machine, including starting the application, when it is invoked on a set of data, when it stops processing a set of data with a result, when it is writing out an intermediate result, when it encounters an error, when it is restarted, or when it is being uninstalled. Thus, instead of having a continuous management operation, management tasks are performed in an automated manner at specific points of the application life cycle. An exemplary embodiment of the present techniques is described by way of reference to methodology 200 of FIG. 2 for managing an application in environments with distributed administrative domains between a provider of the application and a user of the application (such as a micro-cloud environment).

In step 202, select points are identified in the life cycle of the application where communication is allowed between the administrative domains. According to an exemplary embodiment, in the case of a micro-cloud environment the management tasks are performed at two specific points (i) when an application is selected for execution by the customer or when (ii) the application executes an instance of its invocation on a piece of data and runs to completion (i.e., when the application has completed). These specific points are chosen since at these points the system has connectivity from the management site to the back end cloud site. At each of these points of invocation of the management functions, specific actions are performed.

For example, when an application is selected for execution, the application uses a script that (a) checks if the version of the application installed on the premises is the latest version or not (b) if it is not the latest version, gets and installs the latest version (c) checks if any configuration or policies on invocation of application to make it more efficient or secure are needed from the main server and installs it, and (d) checks if any bug fixes or patches to fix an error need to be applied. This allows for automated maintenance of management functions in a moment when the customer needs and permits connectivity to the cloud service. Likewise, when the application completes running on one specific instance of its operation, it similarly executes a set of scripts. These scripts report any errors that may have happened from the execution of the specific instance, as well as the fact that the run completed successfully. The successful reporting needs to be provided to the cloud instance so that billing can be performed properly.

At each of these specified times in the micro-cloud instance, the customer may want to check that information flowing from the clients to the server(s) 105 (via the cloud site 104) is compliant with the restrictions the customer wants to provide. In order to alleviate these concerns, the present techniques employ (at one or more of these communication points) a customer-provided filtering script which is invoked at the management point, and only information that passed from the filtering script is allowed to go to the cloud site 104. Similarly, a management script is provided by the application provider which is allowed to execute and report to the cloud service at selected points in the application life cycle. By way of example only, the management script can perform one or more of the following functions: analyze the data from execution of the application, check if any errors have happened during execution of the application, summarize any diagnostic information, and validate that data through the filtering script. By employing a filtering script, the user can specifically specify what information gets passed to the provider (thus eliminating the concerns over transmittal of confidential information. Further, since the information communicated to the provider is preferably limited to management specific information, then the amount of data that is transferred at these specified communication points is generally of a manageable size.

Before the initial installation of the service, the customer and the application provider can check each other's scripts to ensure they agree to these terms. The script representation can be standardized so that the checking can be done in an automated manner. There are a number of different ways to standardize the script representation, e.g., creating a standard script which is openly visible to everyone, and only uses a configuration file that the user or management can provide. Another option is to have a suite of scripts which are all predefined and known, with the selection of the right script by means of a set of rules that the customer or application provider defines. By using these approaches, management functions can be provided to applications that are running in an environment which cannot be approached by standard management tools or personnel.

Thus prior to installation of the service, in step 204 a determination can be made as to whether the user and the provider agree to the content of each other's scripts (filtering and managing scripts, respectively). If it is determined in step 204 that (NO) either the user and/or the provider do not agree to each other's scripts, then in step 206 the (user) filtering script and/or the (provider) management script are revised, and re-presented to the user and/or provider. This process can be iterated until acceptable scripts are reached.

If/when the determination in step 204 is (YES) that the terms are agreeable to the user and provider, then in step 208 management specific information for the application is obtained by the provider (from the user) at the specific points identified in step 202 using the scripts to ensure that the management specific information being obtained conforms to a predetermined information exchange criteria (e.g., as according to the terms initially agreed upon by the parties—see, e.g., step 204, described above). Namely, as provided above, the information transferred to the provider in this step is preferably limited to only management-specific information (to the exclusion of any confidential information). To do so, only the management specific information that has passed from the (user-provided) filtering script is permitted to be obtained by the provider in step 208. As described above, management specific information can include, but is not limited to, information indicating: whether the application needs to be upgraded, whether the configuration of an application needs to be updated (i.e., for better performance), whether the application has an error or a bug within itself and/or whether the application is running or if it has crashed.

In step 210, management functions can then be performed using the management specific information obtained by the provider in step 208. As provided above, management functions can include, but are not limited to, determining whether the user has a latest version of the application installed and, if not then retrieving and installing the latest version, determining if any configuration or policies on invocation of application to make it more efficient or secure are needed from the main server and installs it, and/or determining if any bug fixes or patches to fix an error need to be applied, and applying them.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
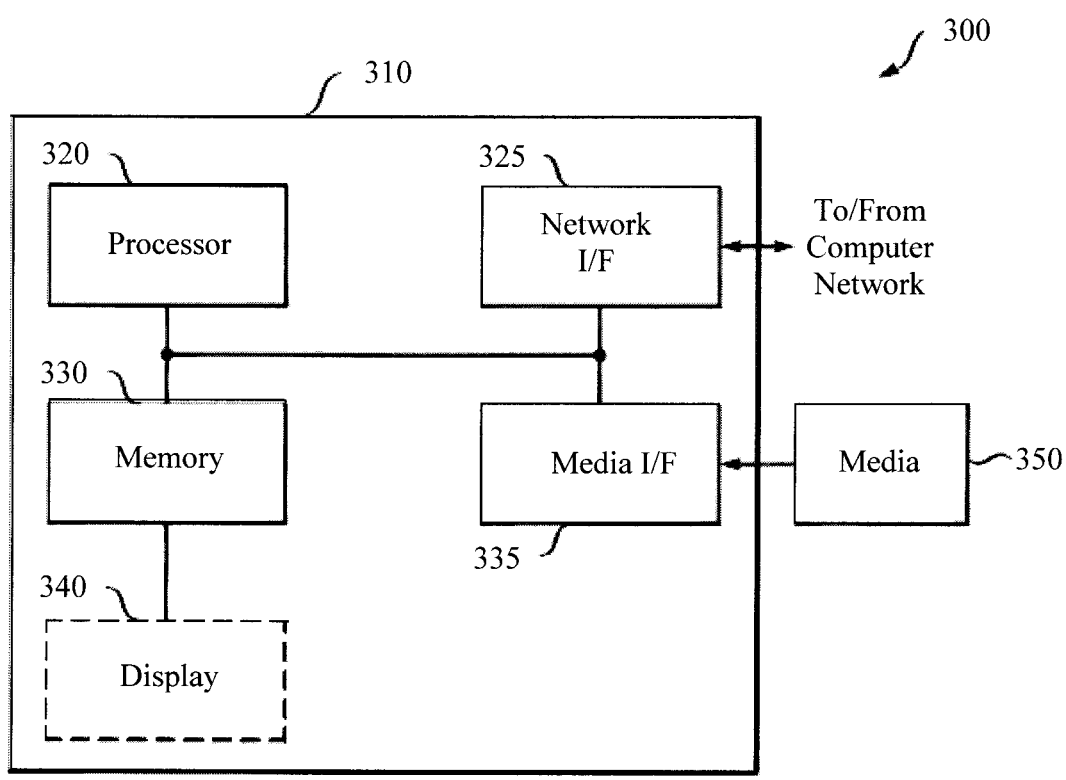
FIG. 3 is a diagram illustrating an exemplary apparatus for performing one or more of the methodologies presented herein according to an embodiment of the present invention.

Turning now to FIG. 3, a block diagram is shown of an apparatus 300 for implementing one or more of the methodologies presented herein. By way of example only, apparatus 300 can be configured to implement one or more of the steps of methodology 200 of FIG. 2.

Apparatus 300 includes a computer system 310 and removable media 350. Computer system 310 includes a processor device 320, a network interface 325, a memory 330, a media interface 335 and an optional display 340. Network interface 325 allows computer system 310 to connect to a network, while media interface 335 allows computer system 310 to interact with media, such as a hard drive or removable media 350.

Processor device 320 can be configured to implement the methods, steps, and functions disclosed herein. The memory 330 could be distributed or local and the processor device 320 could be distributed or singular. The memory 330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 320. With this definition, information on a network, accessible through network interface 325, is still within memory 330 because the processor device 320 can retrieve the information from the network. It should be noted that each distributed processor that makes up processor device 320 generally contains its own addressable memory space. It should also be noted that some or all of computer system 310 can be incorporated into an application-specific or general-use integrated circuit.

Optional display 340 is any type of display suitable for interacting with a human user of apparatus 300. Generally, display 340 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing an application in an environment with distributed administrative domains between a provider of the application and a user of the application, the method comprising the steps of:
   identifying points in a life cycle of the application, from being installed by the user to being uninstalled by the user, when management functions are permitted to determine whether the user has a latest version of the application installed, wherein the points in the life cycle of the application when the management functions are permitted include only i) when the application is selected for execution by the user and ii) when execution of the application by the user is complete, and wherein the environment comprises a micro-cloud environment whereby the application is developed by provider servers and located at a cloud site accessible by the user, and the application is run within a computing infrastructure of the user, and wherein access by the provider to the application being run within the computing infrastructure of the user is limited to the points identified in the life cycle of the application when the management functions are permitted;
   obtaining, by the provider, management specific information for the application at the points identified in the life cycle of the application when the management functions are permitted and thus communication is allowed between the distributed administrative domains, wherein the obtaining is performed using scripts, selected from a predefined suite of scripts by the user and the provider, to validate that the management specific information conforms to a predetermined information exchange criteria agreed upon by the provider and the user; and
   performing automated maintenance of management functions for the application using the management specific information only at each of the points in the life cycle of the application when the management functions are permitted,
   wherein the provider or the user does not agree to terms in the scripts, the method further comprising the steps of:
   revising one or more of the scripts and presenting the scripts that have been revised to the user or the provider; and
   repeating the revising and presenting steps until both the provider and the user agree to the terms in the scripts.

2. The method of claim 1, further comprising the step of:
   permitting only the management specific information that has passed from the scripts to be obtained by the provider.

3. The method of claim 1, wherein the management specific information comprises information indicating one or more of: whether the application needs to be upgraded, whether a configuration of an application needs to be updated, whether the application has an error within itself, and whether the application is running or has crashed.

4. The method of claim 1, wherein the user does not have the latest version of the application installed, the method further comprising the step of:
   retrieving and installing the latest version of the application.

5. The method of claim 1, wherein the step of performing automated maintenance of the management functions for the application comprises the steps of:
   determining if any patches to fix an error in the application need to be applied; and
   applying the patches.

6. A computer program product for managing an application in an environment with distributed administrative domains between a provider of the application and a user of the application, the computer program product comprising a non-transitory computer readable storage medium having program instructions embodied therewith, the program instructions executable by a computer to cause the computer to:

identify points in a life cycle of the application, from being installed by the user to being uninstalled by the user, when management functions are permitted to determine whether the user has a latest version of the application installed, wherein the points in the life cycle of the application when the management functions are permitted include only i) when the application is selected for execution by the user and ii) when execution of the application by the user is complete, and wherein the environment comprises a micro-cloud environment whereby the application is developed by provider servers and located at a cloud site accessible by the user, and the application is run within a computing infrastructure of the user, and wherein access by the provider to the application being run within the computing infrastructure of the user is limited to the points identified in the life cycle of the application when the management functions are permitted;

obtain, by the provider, management specific information for the application at the points identified in the life cycle of the application when the management functions are permitted and thus communication is allowed between the distributed administrative domains, wherein the obtaining is performed using scripts, selected from a predefined suite of scripts by the user and the provider, to validate that the management specific information conforms to a predetermined information exchange criteria agreed upon by the provider and the user; and perform automated maintenance of management functions for the application using the management specific information only at each of the points in the life cycle of the application when the management functions are permitted, wherein the provider or the user does not agree to terms in the scripts, and the program instructions further cause the computer to:

revise one or more of the scripts and present the scripts that have been revised to the user or the provider; and repeat the revising and presenting steps until both the provider and the user agree to the terms in the scripts.

7. The computer program product of claim 6, wherein the program instructions further cause the computer to:

permit only the management specific information that has passed from the scripts to be obtained by the provider.

8. The computer program product of claim 6, wherein the management specific information comprises information indicating one or more of: whether the application needs to be upgraded, whether a configuration of an application needs to be updated, whether the application has an error within itself, and whether the application is running or has crashed.

* * * * *